Jan. 6, 1970   A. E. JOHNSON   3,488,018
DUCTED PROPULSION UNITS FOR UTOL AIRCRAFT
Filed March 13, 1968   3 Sheets-Sheet 1
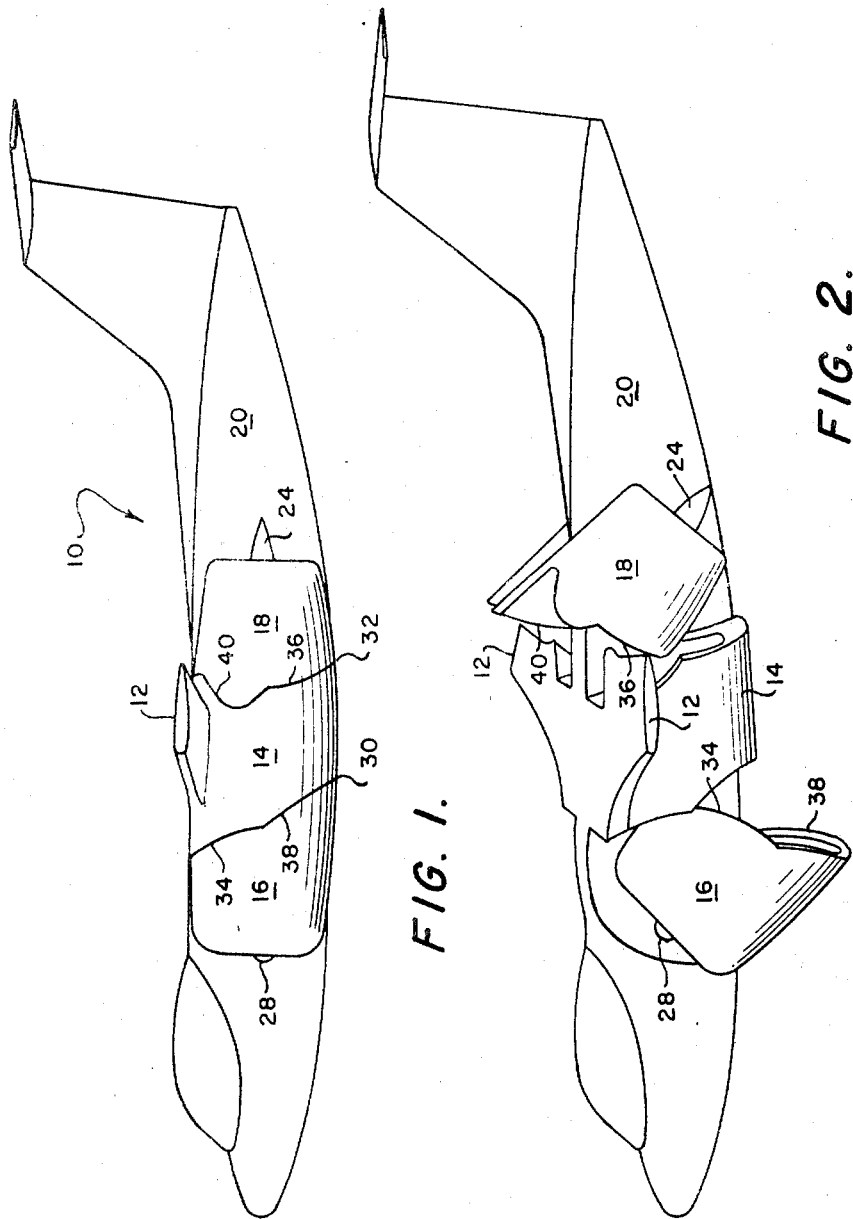
INVENTOR
ARTHUR E. JOHNSON
BY

INVENTOR
ARTHUR E. JOHNSON

BY
ATTORNEY

United States Patent Office 3,488,018
Patented Jan. 6, 1970

3,488,018
DUCTED PROPULSION UNITS FOR VTOL AIRCRAFT
Arthur E. Johnson, Bethesda, Md., assignor to the United States of America as represented by the Secretary of the Navy
Filed Mar. 13, 1968, Ser. No. 712,638
Int. Cl. B64c 29/00
U.S. Cl. 244—12                    7 Claims

ABSTRACT OF THE DISCLOSURE

A propulsion system for the vertical take-off and landing (VTOL) aircraft having tiltable tandem mounted ducted propeller propulsion units. The propulsion units are connectable together to form a closed fluid path when the ducts are positioned for horizontal forward flight and thereby present a one propeller disc area. When the ducts are tilted for vertical flight, the individual propulsion units become disconnected, thereby presenting double the thrust area desirable for vertical flight.

---

The invention described herein may be manufactured and used by or for the Government of the United States of America for governmental purposes without the payment of any royalties thereon or therefor.

BACKGROUND OF THE INVENTION

This invention relates to an aircraft of the vertical take-off and landing (VTOL) type and more particularly to controllably tiltable ducted or shrouded propellers tandemly arranged, the ducts of which are axially oriented together, either directly or by means of an intermediate duct, during horizontal flight. When ducted together the plurality of propulsion units on one side of the aircraft will operate as a multi-stage compressor wherein the after propeller increases the pressure produced by the forward propeller.

Military and civilian aircraft activities have indicated a need for an aircraft capable of using a short landing field or simply a cleared area, and yet capable of high speed forward horizontal flight. Modern high speed aircraft using propeller or jet propulsion means are capable of high speeds however require long runways in order to attain sufficient lift to clear ground obstacles such as trees and buildings. Helicopters, on the other hand, are capable of operating into and out of simple cleared areas however are not capable of high speed flight.

Aircraft of the vertical take-off and landing type have been developed which utilize controllably tiltable engine and propeller pods and may be of jet, propeller, or shrouded propeller designs. While these designs are somewhat satisfactory, they present the problem of decreased propulsive efficiency because, generally, the propulsion units are not capable of providing good efficiency in both the take off and cruise modes of the aircraft. When in a configuration for forward horizontal flight, systems capable of providing efficient vertical thrust, are oversized in weight, area and power. Conversely, a propulsion system designed for efficient forward horizontal flight will have poor efficiency in vertical flight.

In prior art VTOL aircraft having multiple propulsion units on a side, the units have been displaced vertically or transversely in an attempt to eliminate disturbances to after units. It has been found, however, that air flow disturbances created by the forward unit deleteriously affect the entrance flow of the after unit.

SUMMARY

The present invention provides a plurality of tiltable propulsion units mounted on the aircraft for rotation about transverse axes and comprising ducted fans, shrouded propellers, or the like which may be ducted together for forward horizontal flight and thereby substantially eliminate the disadvantages of the prior art VTOL aircraft configurations. More specifically, the problem in forward horizontal flight of the forward propulsion units interfering with the entrance flow stream of the after unit is eliminated by ducting the forward propulsion unit's exit air into the after unit entrance through the use of coupled ducted propellers to provide a predictable flow path to the after propeller. This coupling maybe accomplished through an intermediate duct interposed between the two propulsion units or by directly coupling the two propulsion units together in a tandem fashion. The rear termination of the forward propulsion unit and forward termination of the after propulsion unit will mate together or to the intermediate duct to provide a closed fluid path. The joint will be shaped so that tilting of the propulsion units, about their transverse axes will cause a sliding apart of the two adjoining terminations out of their closed fluid relationship. For forward horizontal flight, the tandem propulsion units will be rotated to be axially in line and ducted together to provide a closed fluid path such that they will operate as a multi-stage compressor. The forward engine will provide the after engine with an increased pressure which will further increase the pressure. For take off and landing, the propulsion units will be tilted about an axis transverse of the fuselage of the aircraft out of ducted engagement until each propulsion unit is vertical and will produce vertical thrust.

As can be seen, when the propulsion units are arranged for forward horizontal flight, the propulsion units on each side of the aircraft will present a frontal area equal to one propulsion unit and when oriented for vertical flight (take-off and landing mode), the propulsion units will present a thrust producing area equal to the number of propulsion units on each side of the aircraft, thereby producing better thrust efficiency in these different flight modes.

Accordingly, it is the principal object of this invention to provide an improved propulsion system for VTOL aircraft which has the advantage of high speed forward horizontal flight and is capable of vertical flight for landing and take-off from short runways or cleared areas.

Another object of this invention is to provide a VTOL aircraft propulsion system of increased propulsive efficiency presenting a frontal area of one propulsion unit per side when configured for forward horizontal flight, while at the same time being capable of presenting a thrust area equal to the number of propulsion units on the aircraft when configured for take-off and vertical flight.

Still another object of this invention is to provide a VTOL aircraft propulsion system wherein the propulsion units on one side of the aircraft will operate as a multi-stage compressor.

Other objects and features of the invention will become apparent to those skilled in the art upon reference to the accompanying specifications, claims, and drawings in which:

BRIEF DESCRIPTION OF THE DRAWINGS

FIG. 1 is a perspective side view of an aircraft having the tandem propulsion units according to this invention in line and ducted together for forward flight;

FIG. 2 is a perspective side view of an aircraft having the propulsion units according to this invention in a transition position from horizontal to forward flight configuration;

DESCRIPTION OF THE PREFERRED EMBODIMENTS

Figure 4:
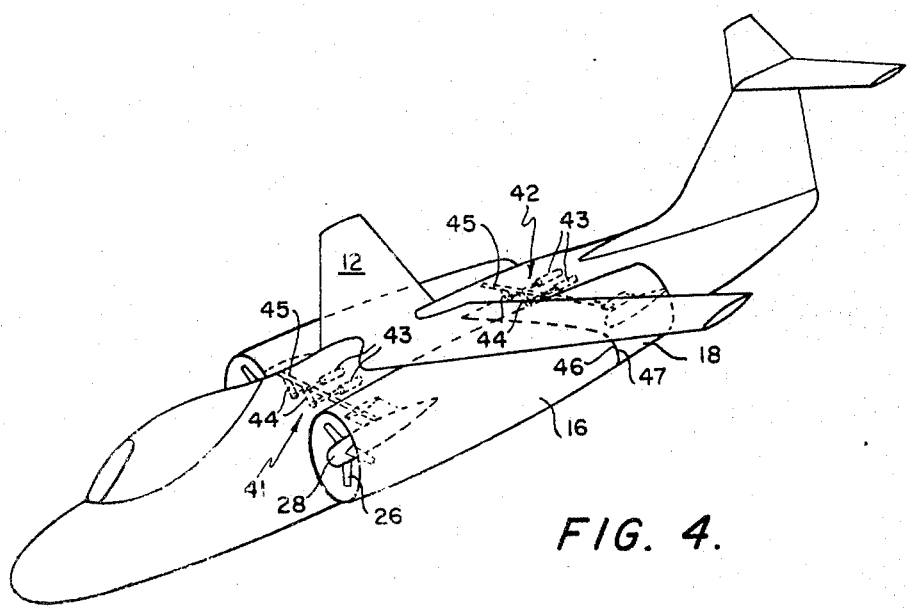
FIG. 4 is a perspective view of an aircraft having propulsion units according to another embodiment of this invention in which the propulsion units are complementary and coupled directly together.

Referring now to the drawings wherein like reference numerals refer to like parts, there is shown an aircraft 10 having an intermediate duct 14, and thrust producing propulsion units 16 and 18 according to this invention attached subjacent the wings 12. It is to be understood that the intermediate duct and propulsion units may also be connected to the wings by subtending struts. Preferably, the propulsion units will be propellers 26 having a plurality of blades and rotating within a ducted shroud or throat. Contained within the duct there is shown, particularly in FIG. 3, stationary vanes 22 extending across the air flow entrance and connected together at the center. These stationary vanes 22 act as the support for the bearings or journals of the rotating propellers 26, as well as for supporting the conical fairings 24 and 28.

Figure 3:
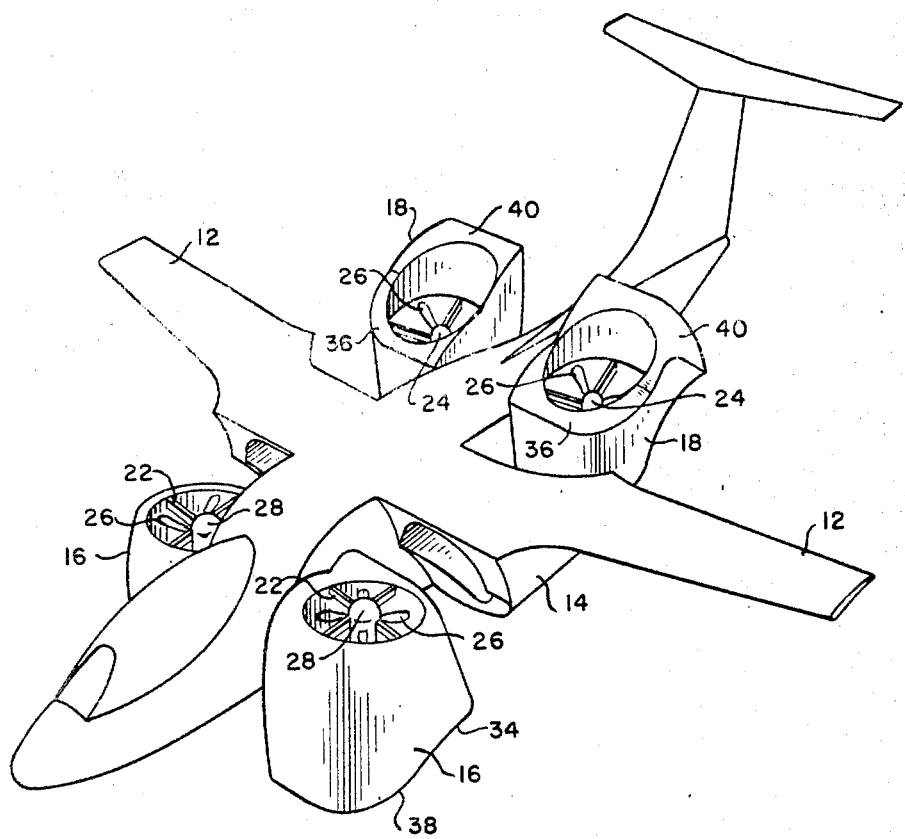
FIG. 3 is a perspective top view showing the propulsion units of an aircraft unducted and in position for producing vertical thrust for vertical flight.

Referring now to FIG. 1, at the exit of the after propulsion unit 18 and attached to the stationary vanes 22, there is a fairing member 24 of a conical shape extending to a point toward the aft. FIG. 3 shows a conical fairing member 28 attached to the stationary vanes 22 in the entrance flow path of the forward propulsion unit. Additional fairing members in the form of bodies of rotation as well as stationady vanes (both are not shown) may be contained within the intermediate duct 14 attached to the wing 12.

FIG. 1 shows the aircraft 10 with the forward propulsion unit 16 and the after propulsion unit 18 in tandem and axially aligned providing a closed fluid flow path from one unit to the other. In this arrangement for forward horizontal flight, the duct joint 30 between the forward propulsion units 16 and the intermediate ducted 14, and joint 32 between the intermediate duct 14 and the after propulsion unit 18 are closed. The after propulsion unit 18 accepts the pressurized air from the forward propulsion unit 16 and further increases the pressure. The duct joints 30 and 32 are, respectively, curve-shaped at the top portion 34 and at the bottom portion 36 to permit rotation or tilting of the propulsion units 16 and 18 about their transverse axes from an axial alignment as shown in FIG. 1 through a transition point as shown in FIG. 2. FIG. 3 shows the propulsion units 16 and 18 disconnected from the intermediate duct 14 and where the thrust direction of the propulsion units 16 and 18 is vertical.

The lower portion 38 of joint 30 and the upper portion 40 of joint 32 may have any shape that will produce a closed coupling when the propulsion units 16 and 18 are ducted together or ducted to intermediate duct 14 and which will permit disengagement of the coupling when the tandem units are tilted from their coaxial position as shown in FIG. 1 to a transition point shown in FIG. 2 to the full vertical position as shown in FIG. 3. As shown in the drawings, the propulsion units 16 and 18 are tiltable by rotation on a transverse axis extending through the fuselage of the aircraft 10. The tilt angle of the propulsion units 16 and 18 may be controlled either manually or automatically and may be independently tiltable as required by the aerodynamic design characteristics of the aircraft 10 to maintain proper attitude during vertical ascent and descent.

The design of the aircraft and the propulsion system according to this invention is not limited by the use of the intermediate duct 14 and when not required, the propulsion units 16 and 18 may be directly ducted together in which case the joints 30 and 32 will be shaped in such a manner to permit tilting from a ducted coaxially alignment of the propulsion units 16 and 18 to an unducted and vertical thrust-producing position as shown in FIG. 3. Furthermore the intermediate duct 14 may depend from a strut (not shown) on the wing 12.

DESCRIPTION OF THE OPERATION

As previously stated vertical take-off and landing type (VTOL) aircraft are capable of operating into and out of short runway airfields or simple cleared areas. For this reason, the description of the operation of this aircraft will commence at the beginning of a flight. In this case the aircraft will be resting upon the ground on its landing gear. The pilot will operate control means to tilt the propulsion units 16 and 18 into a position for producing vertical thrust as shown in FIG. 3. The engines will be started and increased in r.p.m. to a point where the propulsion units 16 and 18, by virtue of their rotating propellers 26, produce sufficient sustaining thrust to lift the aircraft from the ground. This procedure will continue until the aircraft has attained a height sufficient to clear obstacles on the ground. At this time, the pilot will operate control means causing the propulsion units to slowly tilt towards a position such as is shown in FIG. 2 to produce both a vertical and horizontal thrust component. As the aircraft 10 attains a forward speed sufficient for the wings 12 to produce sufficient sustaining lift, the propulsion units may be further tilted into a coaxially alignment and thereby closing the joints 30 and 32 to provide a closed fluid flow path between the units and the intermediate duct 14. The propulsion units 16 and 18 will then operate in combination as a multi-stage compressor where a forward propulsion unit increases the pressure of the air to a certain level which is further increased by the after propulsion unit 18. It is to be understood that more than two propulsion units per side of the aircraft may be used and operate as multi-stage compressors.

Figure 5:
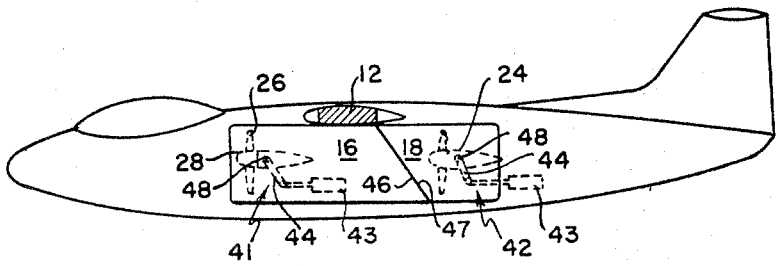
FIG. 5 is a side view of the embodiment shown in FIG. 4.

In forward flight configuration, air is inducted into the entrance of the forward propulsion unit 16 where the flow flaring means in the form of a nosecone 28 and stationary vanes 22 direct the flow into the first propeller 26. Air flow continues through the duct in propulsion unit 16 thence into the intermediate duct 14, which, as previously described, may contain fairing means, and then into the after propulsion unit 18 where another properller 26 further increases the pressure. The air so compressed is then directed towards the rear of propulsion unit 18 where fairing means in the form of a tailcone 24 directs the flow smoothly towards the rear of the aircraft. FIGS. 4 and 5 show another embodiment of the invention in which no intermediate duct-like structure is used to couple the forward and after propulsion units 16, 18. Instead, the after termination 46 of the forward propulsion unit 16 is complementary in shape to the forward termination 47 of the after propulsion unit 18. FIGS. 4 and 5 include a general showing of a tilting means of well-known construction adaptable to the invention. The forward unit tilting means 41 may be essentially the same as the after unit tilting means and comprises hydraulic units 43, lever arms 44, and axles 45. The pilot controls the positioning of each hydraulic unit by conventional means which in turn crank the lever arm 44 of the associated axle 45. FIG. 5 clearly illustrates the tilt axis 48 of each propulsion unit.

As can be seen, the propulsion units are designed to interact with each other rather than the forward propulsion unit causing disturbances in the air flow of the after unit.

Upon desiring to land the pilot will slow the plane down to a speed just before wing stall and reverse the procedure previously described by using control means to tilt the propulsion units 16 and 18 into a vertical thrust producing position. He then slowly decreases the power to slowly settle the aircraft on the ground within the clearing provided.

It should be understood, of course, that the foregoing disclosure relates only to the preferred embodiment of the invention and that numerous modifications or alterations such as placing the propulsion units on a subtending strut from the wing, eliminating the intermediate duct so that the propulsion units are ducted directly together, and providing more than two propulsion units per side, may be made therein without departing from the spirit and the scope of the invention.

What is claimed is:

1. A propulsion system on each side of a VTOL aircraft, comprising:
   a first propulsion unit attached for rotation about a transverse axis of the aircraft which includes propeller means having an axis of rotation;
   a second propulsion unit attached for rotation about another transverse axis of the aircraft which includes propeller means having an axis of rotation;
   each of said propulsion units having a duct-like structure substantially enclosing each of said propeller means;
   tilting means for rotating each of said propulsion units about its transverse axis; and
   means forming a continuous air flow constraining structure with the incorporation of said duct-like structures which substantially surrounds both said propeller means when said propulsion units are rotated to a position whereby each propeller means has substantially the same axis of rotation.

2. The propulsion system of claim 1 whereby said means forming a continuous air flow constraining structure further includes an intermediate duct attached to said aircraft between said propulsion units.

3. The propulsion system of claim 1 wherein each of said propulsion units contain stationary vanes for air-flow directing purposes.

4. The propulsion system of claim 1 wherein said tilting means rotates each of said propulsion units about its axis independently.

5. The propulsion system of claim 1 wherein the after termination of the forward propulsion unit is complementary in shape to the forward termination of the after propulsion unit.

6. The propulsion system of claim 2 wherein the intermediate duct has a forward termination complementary in shape to the after termination of the forward propulsion unit and an after termination complementary in shape to the forward termination of the after propulsion unit to provide substantially flush mating connection.

7. The propulsion system of claim 2 wherein said intermediate duct is mounted on the wing of the aircraft.

References Cited

UNITED STATES PATENTS

| | | | |
|---|---|---|---|
| 3,065,929 | 11/1962 | Holland | 244—12 |
| 3,081,964 | 3/1963 | Quenzler | 244—7 |
| 3,165,280 | 1/1965 | Lee | 244—12 |
| 3,385,066 | 5/1968 | Mullins | 244—12 |

MILTON BUCHLER, Primary Examiner

THOMAS W. BUCKMAN, Assistant Examiner

U.S. Cl. X.R.

244—56